United States Patent
Kasonde et al.

(10) Patent No.: US 9,643,334 B2
(45) Date of Patent: May 9, 2017

(54) METHOD FOR MAKING SUPER-HARD CONSTRUCTIONS

(71) Applicants: Element Six Abrasives S.A., Luxembourg (LU); Element Six Limited, Clare (IE)

(72) Inventors: Maweja Kasonde, Didcot (GB); Leshope Joseph Choenyane, Springs (ZA); Erens Tshepo Radebe, Springs (ZA); John James Barry, Clare (IE)

(73) Assignees: Element Six Limited, County Clare (IE); Element Six Abrasives S.A., Luxembourg (LU)

( * ) Notice: Subject to any disclaimer, the term of this patent is extended or adjusted under 35 U.S.C. 154(b) by 104 days.

(21) Appl. No.: 14/394,752

(22) PCT Filed: Apr. 17, 2013

(86) PCT No.: PCT/EP2013/058026
§ 371 (c)(1),
(2) Date: Oct. 16, 2014

(87) PCT Pub. No.: WO2013/156536
PCT Pub. Date: Oct. 24, 2013

(65) Prior Publication Data
US 2015/0097321 A1    Apr. 9, 2015

Related U.S. Application Data

(60) Provisional application No. 61/636,428, filed on Apr. 20, 2012.

(30) Foreign Application Priority Data

Apr. 20, 2012  (GB) .................................. 1206965.4

(51) Int. Cl.
*B28B 3/02* (2006.01)
*B22F 3/14* (2006.01)
(Continued)

(52) U.S. Cl.
CPC ............... *B28B 3/025* (2013.01); *B22F 3/14* (2013.01); *B22F 7/062* (2013.01); *B23C 5/10* (2013.01);
(Continued)

(58) Field of Classification Search
CPC ..................................................... B28B 3/025
See application file for complete search history.

(56) References Cited

U.S. PATENT DOCUMENTS

| 4,537,097 A | 8/1985 | Illerhaus et al. |
| 5,766,394 A | 6/1998 | Anderson et al. |

(Continued)

FOREIGN PATENT DOCUMENTS

| JP | 2004516152 A | 6/2004 |
| WO | 0249801 A1 | 6/2002 |
| WO | 2011157667 A1 | 12/2011 |

OTHER PUBLICATIONS

United Kingdom Application No. 1306988.5, Combined Search and Examination Report mailed on Sep. 27, 2013, 5 pages.
(Continued)

*Primary Examiner* — Erin Snelting
(74) *Attorney, Agent, or Firm* — Armstrong Teasdale LLP (57) ABSTRACT

A method of making a construction comprising a polycrystalline super-hard structure joined to a side surface of an elongate substrate. The method includes: providing a vessel configured for an ultra-high pressure, high temperature furnace, the vessel having an elongate cavity for containing a pre-sinter assembly and defining a longitudinal axis, the cavity having opposite ends connected by a cavity wall. The
(Continued)

pre-sinter assembly comprises the substrate, an aggregation comprising a plurality of super-hard grains arranged over at least a part of the side surface of the substrate, and a spacer structure configured for spacing the substrate apart from the cavity wall. The spacer structure comprises material having a Young's modulus of at least 300 GPa. The method further includes inserting the pre-sinter assembly into the cavity, the substrate being substantially longitudinally aligned and the spacer structure arranged between the side surface of the substrate and the cavity wall; applying a force to the pre-sinter assembly and heating it to a temperature, the force being sufficient to generate a pressure within the vessel for sintering the aggregation at the temperature, and providing the construction.

26 Claims, 9 Drawing Sheets

(51) Int. Cl.
| | | |
|---|---|---|
| B22F 7/06 | (2006.01) | |
| B23C 5/10 | (2006.01) | |
| B23P 15/34 | (2006.01) | |
| C04B 35/52 | (2006.01) | |
| C04B 35/5831 | (2006.01) | |
| C04B 35/64 | (2006.01) | |
| C22C 26/00 | (2006.01) | |

(52) U.S. Cl.
CPC .............. *B23P 15/34* (2013.01); *C04B 35/52* (2013.01); *C04B 35/5831* (2013.01); *C04B 35/64* (2013.01); *B23B 2226/125* (2013.01); *B23B 2226/315* (2013.01); *B23C 2226/125* (2013.01); *B23C 2226/315* (2013.01); *C22C 26/00* (2013.01)

(56) References Cited

U.S. PATENT DOCUMENTS

| | | | |
|---|---|---|---|
| 5,868,885 | A | 2/1999 | Crockett et al. |
| 6,446,740 | B2 | 9/2002 | Eyre |
| 7,104,160 | B2 | 9/2006 | Fries et al. |
| 2004/0093989 | A1* | 5/2004 | Fries .................. B22F 7/06 76/108.1 |
| 2005/0263944 | A1* | 12/2005 | Weis .................. B01J 19/02 264/667 |
| 2007/0102199 | A1 | 5/2007 | Smith et al. |
| 2009/0260895 | A1 | 10/2009 | Vail et al. |

OTHER PUBLICATIONS

United Kingdom Application No. 1306988.5, Examination Report mailed on Apr. 15, 2015, 2 pages.
United Kingdom Application No. 1306988.5, Notification of Grant mailed on Jun. 9, 2015, 2 pages.
International Search Report dated Jul. 25, 2013 in Application No. PCT/EP2013/058026.

* cited by examiner

METHOD FOR MAKING SUPER-HARD CONSTRUCTIONS

CROSS REFERENCE TO RELATED APPLICATIONS

This application is the U.S. national phase of International Application No. PCT/EP2013/058026 filed on Apr. 17, 2013, and published in English on Oct. 24, 2013 as International Publication No. WO 2013/156536 A1, which application claims priority to Great Britain Patent Application No. 1206965.4 filed on Apr. 20, 2012 and U.S. Provisional Application No. 61/636,428 filed on Apr. 20, 2012, the contents of all of which are incorporated herein by reference.

This disclosure relates generally to methods for making super-hard constructions, particularly but not exclusively for blank bodies for making cutter elements for rotary tools such as end mills and routers.

U.S. Pat. No. 7,104,160 discloses a method of producing a cutting tool includes the steps of providing an un-bonded assembly comprising a cylindrical core having ends and an elongate side surface covered partially or completely by a coherent, un-sintered layer, the layer comprising ultra-hard abrasive particles suitable for producing an ultra-hard material, subjecting the un-bonded assembly to elevated temperature and pressure conditions at which the ultra-hard abrasive is crystallographically stable, recovering the sintered product which comprises a cylindrical core and an ultra-hard abrasive material bonded to the core, and working the sintered product to produce one or more cutting edges in the ultra-hard abrasive material.

International patent application publication number WO/2011/157667 discloses a method for making a cutter element for a rotary machine tool. The method includes providing a precursor body comprising a super-hard structure such as a PCD or PCBN structure joined to a cemented carbide substrate; the precursor body having a proximate end, a distal end and a peripheral side connecting the proximate and distal ends, the super-hard structure disposed on the peripheral side. The method further includes removing portions of the super-hard structure from the peripheral side to form a plurality of cutting edges on the peripheral side, consecutive cutting edges spaced apart from each other by at most about 10 mm.

There is a need for efficient methods for making super-hard constructions, particularly but not exclusively for use in making cutter elements for rotary machine tools.

Viewed from a first aspect there is provided a method of making a construction comprising a polycrystalline super-hard structure joined to a side surface of a generally elongate substrate; the method including: providing a vessel for an ultra-high pressure, high temperature furnace, the vessel having a generally elongate cavity for containing a pre-sinter assembly and defining a longitudinal axis, the cavity having opposite ends connected by a cavity wall; the pre-sinter assembly comprising the substrate, an aggregation comprising a plurality of super-hard grains arranged over at least a part of the side surface of the substrate, and a spacer structure configured for spacing the substrate apart from the cavity wall; the spacer structure comprising or consisting essentially of material having a Young's modulus of at least about 300 GPa or at least about 500 GPa; the method further including inserting the pre-sinter assembly into the cavity, the substrate being substantially longitudinally aligned and the spacer structure arranged between the side surface of the substrate and the cavity wall; applying a force to the pre-sinter assembly and heating it to a temperature, the force being sufficient to generate a pressure within the vessel for sintering the aggregation at the temperature, and providing the construction.

The spacer structure will be configured to provide lateral support for the substrate.

Various arrangements and combinations of the vessel, pre-sinter assembly and components of the pre-sinter assembly, and variations of the method are envisaged by this disclosure, and non-limiting, non-exhaustive examples are described below.

The vessel may be configured for insertion into a chamber of an ultra-high pressure, high temperature furnace (also referred to as an ultra-high pressure, high temperature press, or simply an HPHT press). The chamber (which may be referred to as a pressure chamber) will be configured for accommodating the vessel, the HPHT press being configured to be capable of applying load onto the vessel in the chamber and thus generating pressure within the contents of the vessel. In some example arrangements, the HPHT press may be a belt type press and the chamber may be generally cylindrical and defined by a die comprising cemented carbide material, and load may be applied to the vessel by means of a oppositely travelling anvils impinging on opposite ends of the vessel. In such arrangements, the die will provide external lateral support for the vessel when the vessel is loaded by the anvils.

The force may be applied longitudinally or tri-axially to the pre-sinter assembly.

In some example arrangements, the spacer structure may be an integral part of the substrate (in other words, the spacer structure and the rest of the substrate may form a unitary body). The generally elongate substrate may comprise the spacer structure extending laterally from a longitudinal core structure of the substrate. Arrangements in which the spacer structure is provided by a part of the substrate are likely to have the aspect that super-hard grains from the aggregation are less likely to intrude between the spacer structure and the core structure (since there will be no gap between the spacer structure and the core structure).

In some example arrangements, the spacer structure may directly abut the substrate and or an intermediate structure (e.g. a support or containment structure) may be present between at least a part of the substrate and at least a part of the spacer structure.

The spacer structure may directly abut the cavity wall and or an intermediate structure (e.g. a support or containment structure) may be present between at least a part of the spacer structure and at least a part of the cavity wall.

The method may include using more than one spacer structure, each arranged at a respective different longitudinal position along the substrate.

In some example arrangements, the spacer structure may comprise a ring-shaped or annular structure, or the spacer structure may be generally configured as an end disc integrally formed with, attached to or abutting an end of the substrate.

In some example arrangements the spacer structure may comprise a slidable ring, into which a part of the substrate can be inserted. The slidable ring may be arranged at an end of the substrate or at an axial position remote from an end of the substrate, such as at or near the axial centre of the substrate. More than one ring may be used and arranged at different axial positions along the substrate, such as at opposite ends thereof. The aggregation of super-hard grains may be arranged in the pre-sinter assembly such that it abuts the slidable ring. The ring may comprise the same or a different material than that comprised in the substrate. The ring may become joined to the substrate during the manufacture of the super-hard construction, particularly during the step of sintering a polycrystalline super-hard structure. The ring may be removed from the construction by electro-discharge machining (EDM) or grinding, for example.

In some example arrangements, the substrate may comprise an elongate core structure and an end cap defining a proximate end surface of the substrate and extending a lateral extent beyond the core structure. In some examples, the lateral extent may be at least about 1 mm, at least about 2 mm or at least about 3 mm. The lateral extent may be at most about 10 mm or at most about 5 mm. The end cap may provide the spacer structure.

In some example arrangements, the substrate may be rotationally symmetric about the longitudinal axis (when assembled in the vessel).

In some example arrangements, the substrate may have edges or corners that are radiused or bevelled (rather than relatively sharp). This may reduce the risk of cracking of the construction or tool made from the construction.

In some example arrangements, the substrate may comprise an elongate core structure having a first cross sectional lateral dimension (e.g. a first diameter) and a radially extending peripheral end structure at one end having second lateral dimension (e.g. a second diameter), the second dimension being substantially greater than the first dimension, the cross sectional lateral dimension of the substrate varying continuously from the first dimension to the second dimension. In some examples, variation of the lateral dimension may define a radius of curvature of a side surface of the substrate. The radius of curvature may be at least about 2 mm and or at most about 20 mm. A continuous transition from a smaller core diameter to a larger end diameter may have the effect of reducing internal stress within the substrate and is likely to reduce the risk of the substrate fracturing during cold compaction stage of the ultra-high pressure sintering of the aggregation (i.e. while the pressure is being increased to the ultra-high pressure and the temperature is still relatively low).

In some examples, the spacer structure and or the substrate may comprise or consist essentially of material having a Young's modulus of at least about 300 GPa or at least about 500 GPa at ambient temperature (about 20 to about 30 degrees centigrade) and or at a temperature of at least about 1,000 degrees centigrade.

In some examples, the spacer structure may comprise hard-metal such as cemented tungsten carbide material; ceramic material such as alumina, silicon nitride, silicon carbide, zirconium oxide (zirconia) or tantalum oxide; nickel based super-alloy material such as Inconel™; super-hard material and or material containing super-hard grains, such as hard-metal or ceramic material containing grains of diamond or cubic boron nitride (cBN) dispersed therein. The substrate may comprise or consist essentially of cemented carbide material such as cemented tungsten carbide material.

The vessel and or intermediate support structure may comprise pyrophyllite, mullite, kyanite, kaolinite, salt such as potassium salt (e.g. potassium chloride) or ceramic material such as magnesium oxide. Pyrophyllite comprises aluminium silicate hydroxide ($Al_2Si_4O_{10}(OH)$). Mullite, which is also called porcelainite is a rare silicate mineral and can form the two stoichiometric forms $3Al2O3(2SiO2)$ or $2Al2O3.SiO2$. Kaolinite ($Al2Si2O5(OH)4$) is a mineral that may be found in rock formations comprising kaolin. Kyanite is a member of the aluminosilicate series, which also includes the polymorph andalusite and the polymorph sillimanite.

The super-hard grains may comprise natural or synthetic diamond and or cubic boron nitride (cBN) and the sintered polycrystalline super-hard structure may comprise polycrystalline diamond (PCD) material, polycrystalline cubic boron nitride (PCBN) material, silicon carbide bonded diamond (SCD) material, and or cemented carbide material comprising super-hard grains.

The ultra-high pressure may be at least about 4 GPa, at least about 5 GPa, at least about 7 GPa or at least about 8 GPa. The high temperature may be at least about 1,000 degrees centigrade or at least about 1,200 degrees centigrade.

The construction may be for a blank body from which a rotary machine tool cutter element can be manufactured. For example the construction may be configured such that it can be processed to form a cutter element for a router or end mill.

The aggregation may comprise substantially loose super-hard grains or super-hard grains combined with a binder material for binding the grains together. The aggregation may comprise a plurality of filaments, foils or sheets comprising the super-hard grains. The method may include shredding or otherwise fragmenting sheets to provide the granules. The aggregation may comprise an extruded body comprising the super-hard grains. In general, aggregations in which the grains are held together by binder material are likely to have the aspect of reduced risk of the grains becoming lodged between components of the pre-sinter structure and the vessel or of the shape of the aggregation being distorted.

The method may include providing granules comprising the super-hard grains, combining and compacting the granules against the substrate.

In some examples the method may include providing a slurry comprising the super-hard grains and injection molding the slurry to provide the aggregation.

In some example arrangements, the substrate may comprise an elongate core structure having a side surface against which the aggregation may be disposed. The aggregation may be spaced apart from at least one end of the substrate by at least about 1 mm or at least about 2 mm. In some arrangements, the aggregation may be spaced apart from the end of the substrate by the spacer structure.

In some example arrangements, the aggregation may extend peripherally, such as circumferentially, all the way around at least a part of the of the substrate.

The method may include processing the super-hard structure to provide a cutting edge.

The method may include brazing an end of the construction to a tool carrier.

The method may include providing the construction with attachment means for attachment to a tool carrier. For example, the attachment means comprises threading (for attachment by threaded screw means), a flange or a bore.

It may be desired for practical or economic reasons to manufacture super-hard rotary cutter elements by processing precursor constructions (sometimes called blank bodies), which may comprise a super-hard structure arranged around the side of a core body made from a less hard material such as cemented carbide material. Such processing may involve cutting or grinding the super-hard structure to provide a cutting edge or a plurality of cutting edges. In order for this approach to be economical, it is likely that a very high degree of dimensional accuracy is required for the precursor constructions. Unfortunately, it may generally be expected that sintering super-hard grains onto a side surface of an elongate substrate poses significant practical challenges.

Preparation of the pre-sinter assembly is likely to involve compacting the aggregation against the sides of the substrate, during which process the substrate may become misaligned or grains of super-hard material may become lodged in undesirable locations within the pre-sinter assembly. Such misalignment and distortion is likely to become permanently established in the construction when the aggregation is sintered at the ultra-high pressure. Even slight misalignment and distortion can be significant owing to the relatively high cost of processing super-hard structures, which will be required if the structures are malformed. Methods according to this disclosure have the aspect of reduced risk of deformation of the substrate and or of the aggregation and consequently of the super-hard structure, during preparation of the pre-sinter assembly and or the step of sintering the aggregation at the ultra-high pressure.

This disclosure may provide a blank body for a rotary machine tool cutter element, comprising a super-hard structure joined to a side surface of an elongate core structure and enclosing at least part of the core structure at least a part of a proximate end surface comprising material capable of being joined to a braze alloy such as a non-active braze alloy; the super-hard structure being spaced apart from the proximate end surface of the blank body. Use of non-active braze alloys have the aspect that the temperature required for brazing is lower than that required for active braze alloys, and is likely to reduce the risk of thermal stress and consequent failure of the tool.

In some example arrangements, a part of the core structure that defines the end surface may comprise a disc-like or solid cylinder-like formation, a peripheral annular volume of which may separate the super-hard structure from the end surface.

In some example arrangements, the super-hard structure may completely enclose an volume of the core structure, or the super-hard structure may partly enclose (or encircle) a volume of the core structure.

In some example arrangements, the blank body may have a central longitudinal axis about which the core structure and or the super-hard structure are rotationally symmetrical.

In some example arrangements, the super-hard structure may define an external side area of the blank body and may extend continuously around a volume of the core structure.

Disclosed blank bodies and cutter elements may have the aspect that the risk of cracking or de-lamination of the super-hard construction when the blank body or cutter element is brazed to a tool carrier is reduced.

Non-limiting example arrangements will be described below with reference to the accompanying drawings of which

Figure 1A:
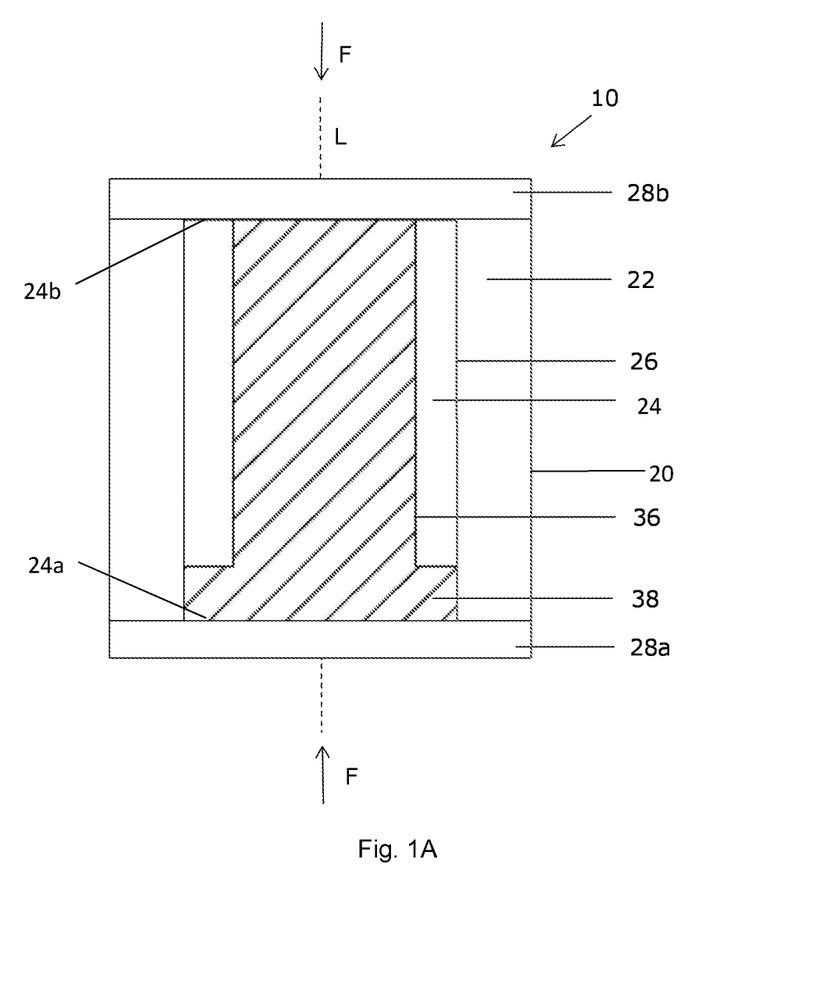
FIG. 1A shows a cross section view of a highly schematic drawing of an example vessel for insertion into a chamber of a belt-type ultra-high pressure furnace (not shown)
Figure 1B:
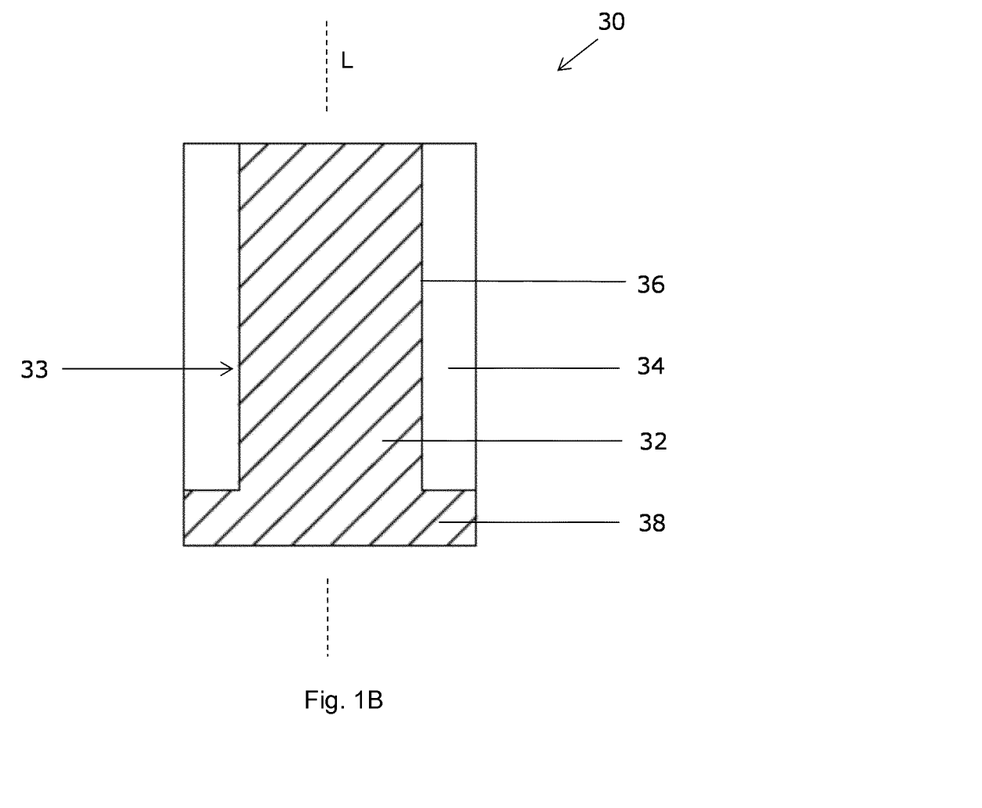
FIG. 1B shows a cross section view of a schematic drawing of a pre-sinter assembly for sintering an example super-hard construction.
Figure 1C:
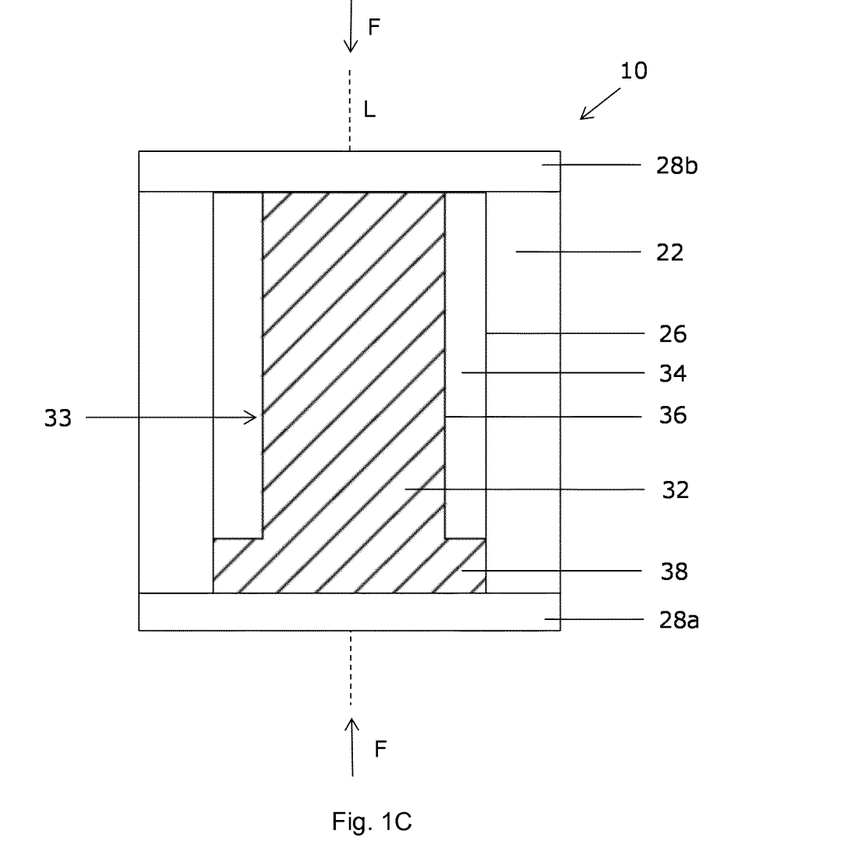
FIG. 1C shows a schematic drawing of an example assembly of the vessel and the pre-sinter assembly illustrated in FIG. 1A and FIG. 1B.

With reference to FIG. 1A, an example vessel 20 for insertion into a chamber of a belt-type ultra-high pressure furnace (not shown) comprises a generally cylindrical tube 22 having a cylindrical cavity 24 for containing a pre-sinter assembly and defining a longitudinal axis L. The cavity 24 has opposite ends 24a, 24b connected by a cavity wall 26. In the particular example shown, discs 28a, 28b are provided at each end of the tube to close the cavity 24 at the respective ends 24a and 24b. In this particular example, the tube 22 and the discs 28a, 28b comprise pyrophyllite. With reference additionally to FIG. 1B, an example pre-sinter assembly 30 comprises a cylindrically symmetric substrate 32, an aggregation 34 comprising a plurality of super-hard grains arranged circumferentially around a side surface 36 of the substrate 32, and a spacer structure 38. The substrate 32 consists essentially of cobalt-cemented tungsten carbide material, which is an example of hard-metal material. The substrate 32 comprises a cylindrically shaped core structure 33, from one end of which the spacer structure 38 extends radially. In this particular example, the spacer structure 38 is a unitary part of the substrate 32 and extends the same radial distance circumferentially around the core structure 33 of the substrate 32. The spacer structure 38 consists essentially of cemented carbide material a Young's modulus of about 400 GPa. With reference additionally to FIG. 1C, the pre-sinter assembly 30 (of FIG. 1B) is inserted into the cavity 24 of the vessel 20, the substrate 32 being substantially longitudinally aligned and the spacer structure 38 arranged between the side surface 36 of the core structure 33 of the substrate 32 and the cavity wall 26.

In some examples, the aggregation 34 of diamond grains may be sintered in the presence of the cobalt comprised in the substrate 32 by heating the pre-sinter assembly 30 to a temperature sufficient to melt the cobalt, causing some of the cobalt to infiltrate into the aggregation 34, and applying an ultra-high pressure of at least about 5.5 GPa to the pre-sinter assembly. In some examples, the aggregation 34 may contain cobalt or other catalyst material for diamond. The pressure may be generated by applying sufficiently large opposing longitudinal forces F to the pre-sinter assembly 30 via the discs 28a, 28b. Heat may be applied by passing an electrical current through the assembly 10 and heater elements (not shown) may be provided in the assembly 10, including possibly in the pre-sinter assembly 30 for this purpose. The spacer structure 38 will provide some lateral support for the substrate 32.

In some example arrangements, the pre-sinter assembly may comprise the substrate, the aggregation and the spacer structure encased within a metal container, which may for example comprise refractory metal such as niobium, tantalum or molybdenum, having melting point of at least about 1,480 degrees centigrade. The vessel may comprise an outer tube and a concentric inner tube abutting the outer tube, the inner tube defining a cylindrical cavity of the vessel for accommodating the pre-sinter assembly. The inner tube may comprise material capable of transmitting pressure at the high temperature, such as sodium chloride or certain other salts. The pre-sinter assembly may be inserted into the cavity defined by the inner tube such that the peripheral outer surface of the metal container abuts the inner surface of the inner tube (i.e. the cavity wall). In such example arrangements, part of the metal container will be disposed between the spacer structure contained within it and the cavity wall.

Figure 2:
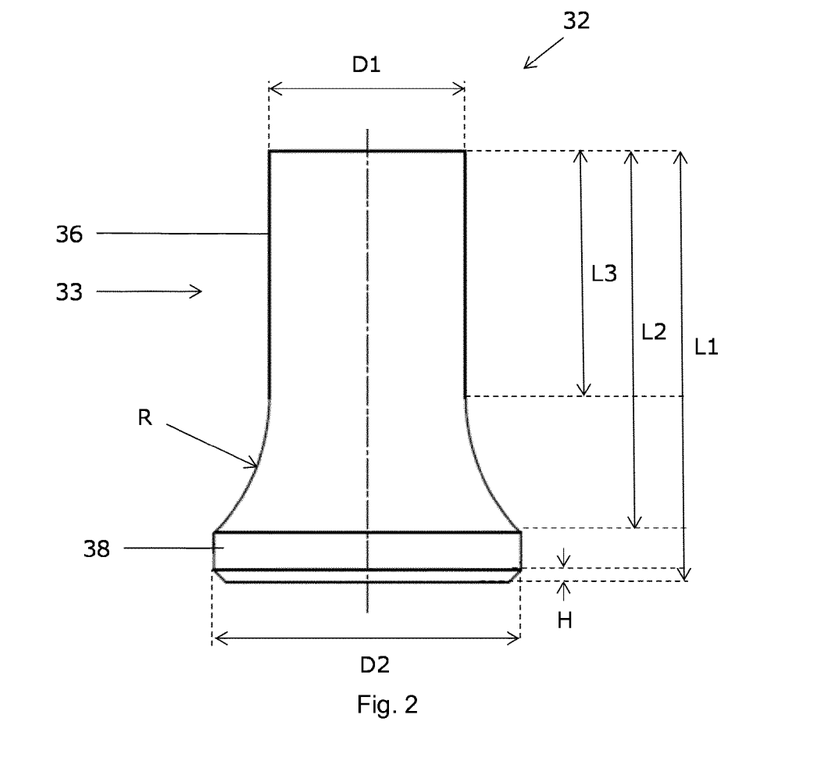
FIG. 2 shows a schematic longitudinal side view of an example substrate.

With reference to FIG. 2, a particular example substrate 32 comprises a cylindrical core structure 33 having a diameter D1 of about 8 mm and a radially extending peripheral end structure 38 at one end having diameter D2 of about 12.5 mm. The diameter of the substrate 32 makes a continuous transition from the smaller diameter D1 of the core structure 33 to the larger diameter D2 of the end structure 38, the transition defining a radius of curvature R of about 7.95 mm. In the particular example illustrated in FIG. 2, L1 is about 17.5 mm, L2 is about 15.5 mm, L3 is about 10 mm and the height H of a bevel on the end structure 38 is about 0.5 mm.

With reference to FIG. 3 to FIG. 11, example arrangements of constructions 40 suitable for use as blank bodies (or precursors) for rotary cutting tools (not shown) comprise a polycrystalline super-hard structure 44 joined to a side surface 46 of a substrate 42 consisting essentially of cemented tungsten carbide. The super-hard structure may consist essentially of PCD or PCBN in some examples.

Figure 3:
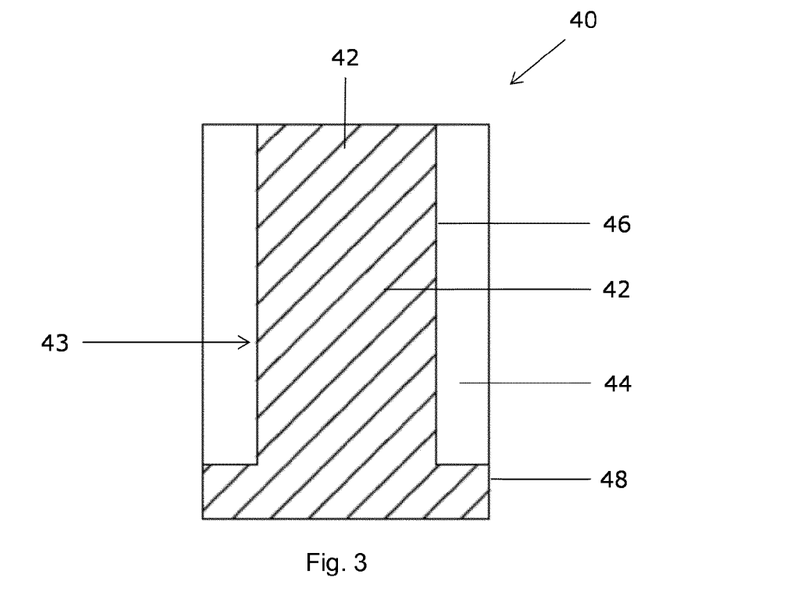
FIG. 3 to FIG. 12 show schematic longitudinal cross section views of an example blank bodies for a rotary tool.

With reference to FIG. 3, an example construction 40 comprises an end structure 48 projecting radially outward from a core structure 43 of the substrate 42, the end structure 48 positioned at a proximate end of the construction 40. The end structure 48 had served as the spacer structure when the construction 40 was manufactured as disclosed above. The PCD structure 44 arose from sintering the aggregation as described above. The end structure 48 and the super-hard structure 44 are arranged with respect to each other that the super-hard structure 44 is spaced apart by about 1 mm from an end of the construction 40 by the end structure 48. The super-hard structure 44 is exposed at a distal end of the construction 40, concentrically surrounding the core structure 43.

Figure 4:
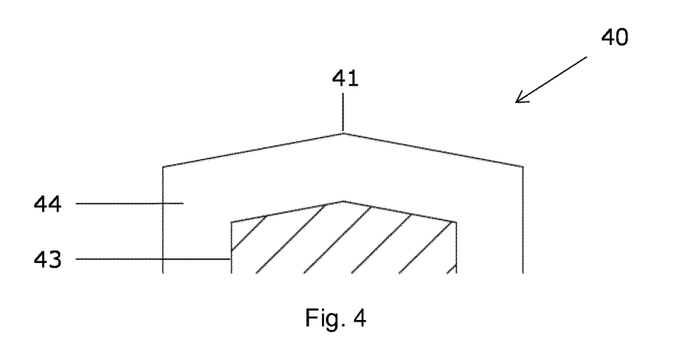
Figure 5:
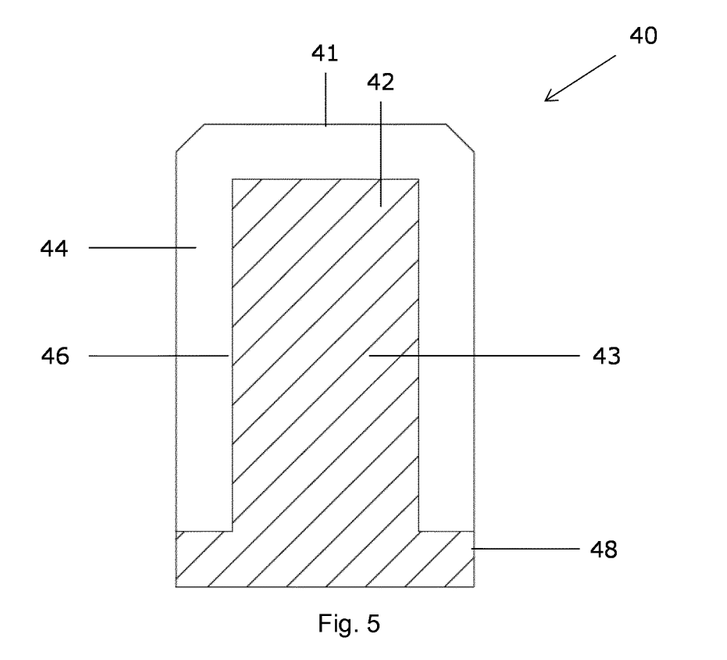
Figure 6:
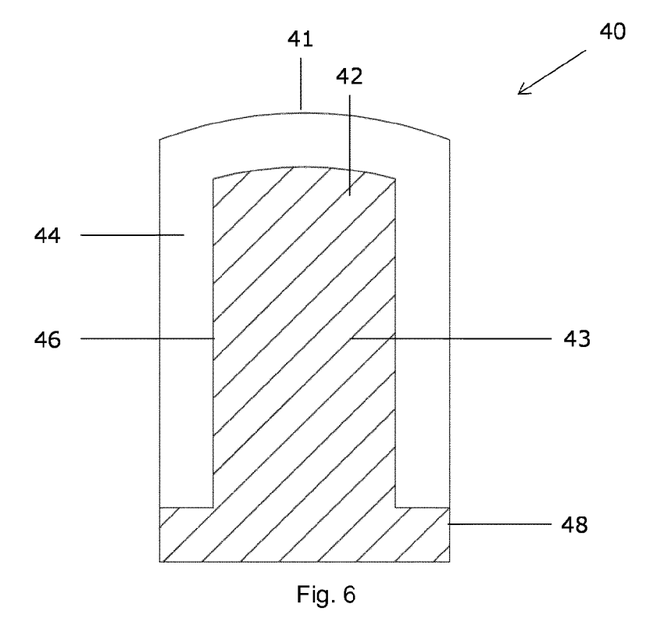

With reference to FIG. 4, FIG. 5 and FIG. 6, example constructions 40 comprise super-hard structures 44 that extend over respective distal ends of respective core structures 43 of the substrate bodies 42, defining respective distal ends 41 of the constructions 40. In some variations as illustrated in FIG. 3, the super-hard structure 44 may define an apex at the distal end 41 of the construction 40. In some variations as illustrated in FIG. 5, the super-hard structure 44 may define a substantially planar distal end surface 41 of the construction 40. The planar end 41 may be provided with a peripheral chamfer. In some variations as illustrated in FIG. 6, the super-hard structure 44 may define a convex round end 41 of the construction 40.

Figure 7:
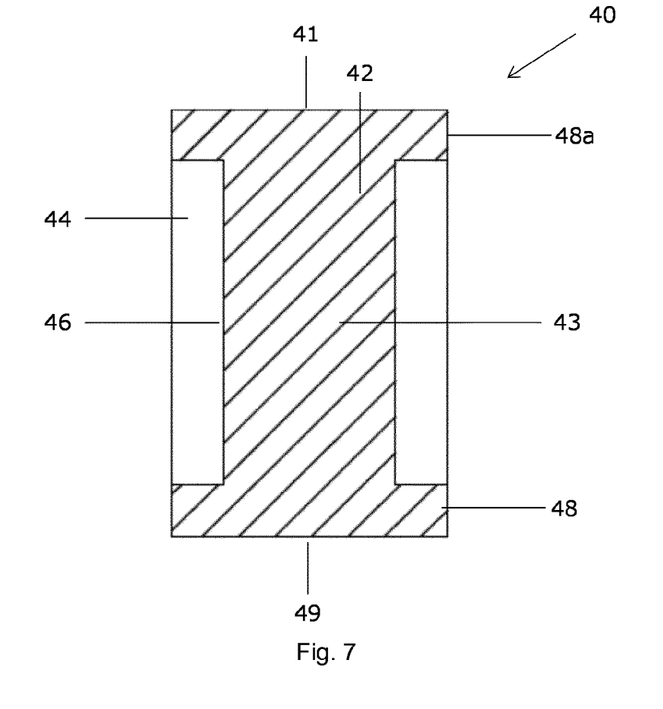

With reference to FIG. 7, an example construction 40 may comprise a cemented carbide substrate 42 having a cylindrical core structure 43 and radially projecting end structures 48, 48a at opposite ends, and a super-hard structure 44 connecting the end structures 48, 48a and extending circumferentially all the way around the core structure 43. The end structures 48, 48a may project radially about 2 mm from the core structure 43 and extend circumferentially around it. The end structures 48, 48a may be about 1 mm thick axially, thus spacing the super-hard structure apart from the respective ends 49, 41 of the construction 40. The end structures 48, 48a will have functioned as respective spacer structures during the manufacture of the construction 40 according to this disclosure. The construction may be processed by cutting or grinding for example, to provide at least one cutting edge on the super-hard structure 44 to make a tool element for a rotary cutting tool such as a router or end mill. At least one of the end structures 48, 48a may be retained as part of the tool element (not shown), which may provide the aspect of making it possible readily to join the construction to a tool carrier by means of brazing with reduced risk of thermally degrading the super-hard structure 44, particularly where the super-hard structure 44 comprises diamond material. This may be because it is substantially easier to braze cemented carbide than certain super-hard materials, particularly diamond material, and because the super-hard structure 44 will be spaced apart from the end being brazed, thereby reducing the risk of thermal damage. In some examples, at least one of the end structures 48, 48a may be removed by cutting or grinding the construction 40.

Figure 8:
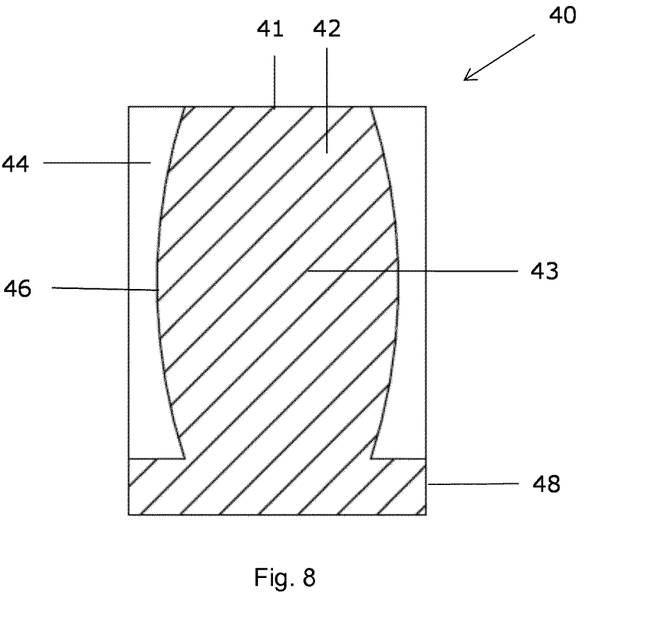

With reference to FIG. 8, an example construction 40 may comprise a substrate 42 having a generally convex cylindrical shaped core structure 43 (which may also be described as barrel-shaped) and a radially projecting end structure 48 at one end, and a super-hard structure 44 having a cylindrical outer side substantially flush with the outer peripheral side of the end structure 48.

Figure 9:
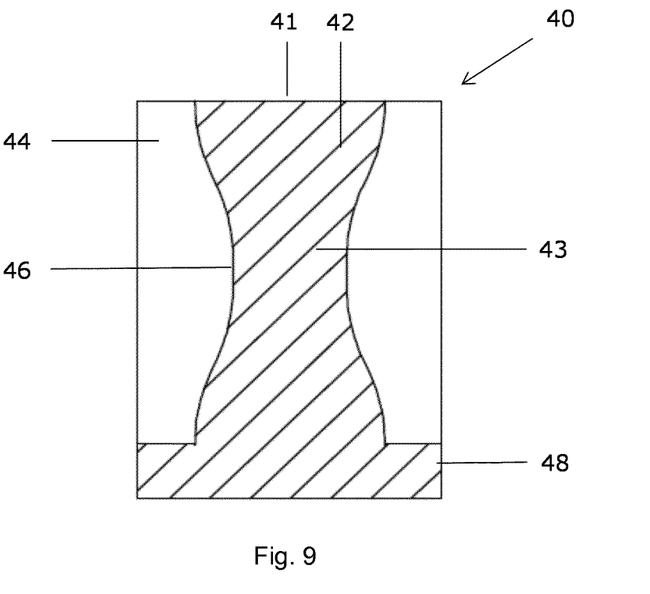

With reference to FIG. 9, an example construction 40 may comprise a substrate 42 having a generally concave cylindrical shaped core structure 43 (which may also be described as hour glass shaped) and a radially projecting end structure 48 at one end, and a super-hard structure 44 having a cylindrical outer side substantially flush with the outer peripheral side of the end structure 48.

Figure 10:
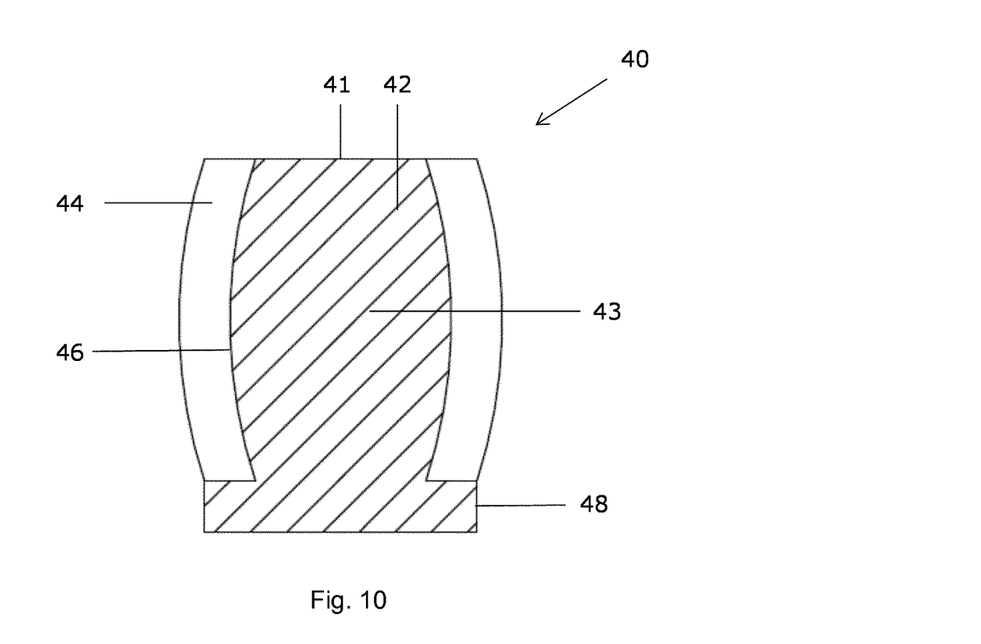

With reference to FIG. 10, an example construction 40 may comprise a substrate 42 having a generally convex cylindrical shaped core structure 43 (which may also be described as barrel-shaped) and a radially projecting end structure 48 at one end, and a super-hard structure 44 having a cylindrical outer side that is substantially conformal and concentric with the shape of the core structure 43 (i.e. the super-hard structure 42 may also have a convex, barrel-shaped outer side).

Figure 11:
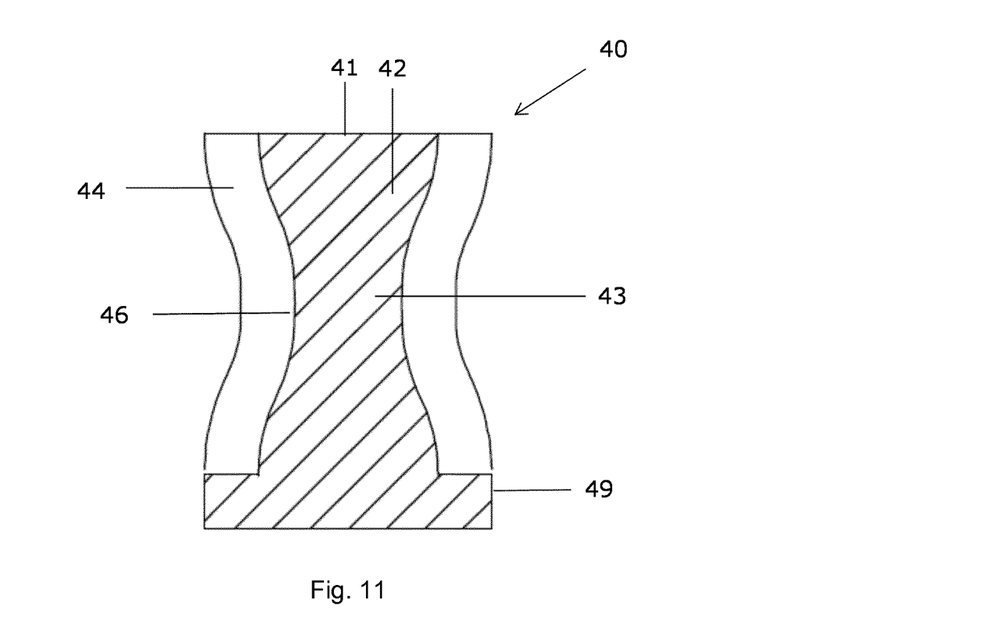

With reference to FIG. 11, an example construction 40 may comprise a substrate 42 having a generally concave cylindrical shaped core structure 43 (which may also be described as hour glass shaped) and a radially projecting end structure 48 at one end, and a super-hard structure 44 having a cylindrical outer side that is substantially conformal and concentric with the shape of the core structure 43 (i.e. the super-hard structure 44 may also have a concave, hour glass shaped outer side).

Figure 12:
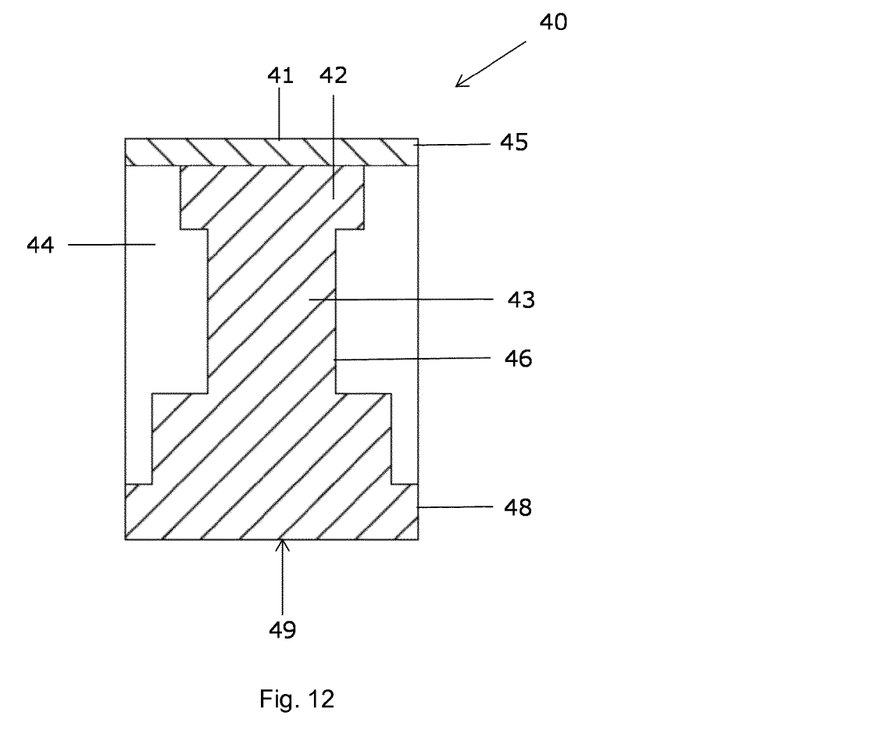

With reference to FIG. 12, an example construction 40 may comprise a substrate 42 having a generally concave stepped cylindrical shaped core structure 43 and a radially projecting end structure 48 at one end, and a super-hard structure 44 having a cylindrical outer side substantially flush with the outer peripheral side of the end structure 48 defining a proximate end 49 of the construction 40. In this example, the core structure 43 will appear to comprise a plurality of right cylindrical regions disposed axially with respect to each other, each having a different radius. The construction 40 may comprise a end disc 45 joined to a distal end of the core structure 43 and defining a distal end 41 of the construction 40. The end structure 48 together with the core structure 43 had formed a unitary substrate 42 (i.e. the end structure 48 is integral with the core structure 43) in the pre-sinter assembly prior to manufacture of the construction at an ultra-high pressure, while the end disc 45 had been a separate component from the substrate in the pre-sinter assembly. Both the end structure 48 and the end disc 49 will have functioned as spacer structures in the pre-sinter assembly during the manufacture of the construction 40. One or both of the end structure 48 or the end disc 45 may be removed by subsequent processing of the construction 40 or may be retained as part of a cutting tool element.

Figure 13:
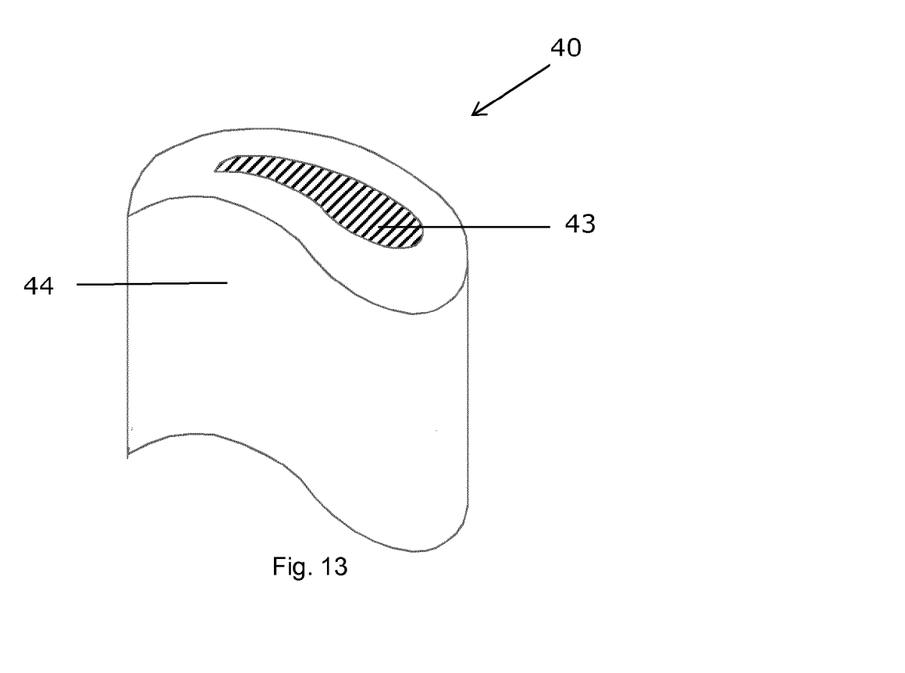
FIG. 13 shows a perspective view of an example blank body.

With reference to FIG. 13, an example construction 40 may have a substantially non-cylindrical shape, comprising a core structure 43 and a super-hard structure 44 having rather complex shapes. The method according to the disclosure will make it easier to provide super-hard constructions having more complex shapes because the spacer structure or structures are likely to reduce the risk of shape distortion during the manufacture process, particularly during the preparation of the pre-sinter assembly. In the example shown in FIG. 13, the spacer structure used in the manufacture of the construction 40 has been removed.

Example methods for making blank bodies will now be briefly described in more detail.

An aggregation of diamond grains may be provided in the form of a plurality of sheets, each comprising diamond grains having a mean size of at least about 0.1 micron and at most about 30 microns held together by an organic binder. At least some of the sheets may also comprise tungsten carbide grains. The sheets may be made by a method known in the art, such as extrusion or tape casting methods, wherein slurry comprising diamond grains and a binder material is laid onto a surface and allowed to dry. Other methods for making diamond-bearing sheets may also be used, such as described in U.S. Pat. Nos. 5,766,394 and 6,446,740. Alternative methods for depositing diamond-bearing layers include spraying methods, such as thermal spraying. In some examples, the aggregation may comprise a mixture of diamond grains and catalyst material for diamond such as Co, Ni, Fe, Mn, which may be combined together by means of milling (e.g. ball billing), and cast into sheets using a plasticizer binder material such as PMMA, DBP and so forth. In some examples the super-hard grains are cBN grains and the super-hard structure may comprise PCBN material. In such examples, the aggregation may comprise a mixture of boron nitride powder with a binder material containing Ti, Al, W or Co and the mixture cast into sheets using a plasticizer material.

A substrate and a spacer structure, either or both of which may be according to any of the examples described in this disclosure (but not limited by them) will be provided. In some example arrangements the substrate may comprise an elongate core structure and an end structure at one end. The end structure may extend a distance radially from the core structure, configured around the core structure to function as a spacer structure according to this disclosure. In some example arrangements the spacer structure may comprise a ring arranged around the substrate, or the spacer structure may comprise a disc arranged at an end of the substrate.

The sheets comprising the diamond grains may be cut to size to fit around the core structure and a pre-sinter assembly may be constructed by wrapping the sheets around the core structure. In some examples, opposite edges of the sheets may be exposed at the distal end, or opposite edges of the sheets may abut respective spacer structures at opposite ends of the substrate. In some example arrangements, sheets containing both diamond grains and tungsten carbide grains may be placed against the core structure and sheets free of tungsten carbide grains may be placed remote from the core structure, the carbide-containing sheets thus being disposed intermediate the core structure and the non-carbide containing sheets. Once sintered, these intermediate sheets may help reduce stress between the PCD structure and the core structure since certain of their properties will be intermediate those of PCD and cemented carbide material.

In some examples the sheets may be shredded to provide a plurality of plate-like granules, or granules may be provided by other means, and the granules may be compacted together against the side surface of the substrate to form the aggregation. In some examples the method may include providing slurry comprising the super-hard grains and making the aggregation by injection moulding the slurry.

In other example variants of the method, the core structure may be placed within a container such as cup configured so that the inner wall of the container is substantially dimensioned to correspond to the shape and dimension of the side surface of the end formation, and substantially loose super-hard grains may be poured into the gap thus formed between the central column and the inner wall of the container. An amount of plasticiser and or binder material and or catalyst material for sintering the super-hard grains may also be introduced into the aggregation in this way, and the aggregation may be compacted. The container may form part of the pre-sinter assembly.

The pre-sinter assembly may be assembled into a capsule for an ultra-high pressure furnace (or press), heated in a furnace to remove volatile gasses and or burn off binder material, and subjected to a pressure of at least about 5 GPa and a temperature of at least about 1,300 degrees centigrade, and the diamond grains sintered together to form a sintered construction comprising a generally tube-like PCD structure joined to a core structure and enclosing the central column of the core structure. Cobalt for promoting the sintering of the diamond and for cementing the grains of the intermediate layer or layers may be sourced from the cemented carbide substrate.

After the sintering process at the ultra-high pressure, the sintered construction can be recovered from the ultra-high pressure apparatus and capsule material removed from it. The construction can then be processed by grinding for example to provide the blank body. The blank body may be further processed to form a cutter element for a rotary tool by a method including forming at least on cutting edge onto the super-hard structure. In one example arrangement, the blank body may have a generally rounded or dome-shaped distal end defined by the super-hard structure and may be suitable for making a ball-nose tool for milling complex cavities. Such tools may have a lateral cross section diameter in the range from about 10 mm to about 25 mm.

An example method for making a cutter element for a rotary machine tool may include providing a blank body comprising a super-hard structure joined to a cemented carbide core structure, in which the super-hard structure is disposed substantially around the peripheral side of a central column of the core structure. The super-hard structure may be joined to the cemented carbide substrate by means of three intermediate layers between the super-hard structure and the substrate. The intermediate layers may comprise grains of tungsten carbide and grains of a super-hard material dispersed in a matrix comprising cobalt. The content of the cobalt in intermediate layer is less than that in layer, which is less than that in layer. Each intermediate layer is at least about 0.2 mm thick and at most about 0.3 mm thick. Portions of the super-hard structure may be removed to expose substrate material underlying the removed portion and providing spaced apart cutting edges on the peripheral side and defined by a super-hard structure, consecutive cutting edges on the peripheral side of the precursor body being spaced apart from each other. In some examples, the cutting edges may be circumferentially spaced apart from each other by at most about 10 mm.

In example methods, the blank body may have a generally convex, rounded or dome-shaped distal end defined by the super-hard structure, which may comprise a PCD or PCBN. A plurality of cutting edges may be formed into the PCD or PCBN structure by machining methods (such as electro-discharge machining, laser cutting or grinding) to form a ball-nosed cutter element. The number of cutting edges may be selected depending on the application. In one embodiment, the edges may be configured generally helically to provide a helical 'sweep' for improved control of chips. For example, a ball-nosed cutter element may comprise cutting edges formed into a PCBN structure.

Example machine tools comprising a disclosed cutter element may be for milling or routing a workpiece, particularly a workpiece comprising a hard or abrasive material such as metal, ceramic material, composite material, wood, stone, concrete or masonry. For example, the machine tool may be a compression router for edge-trimming bodies comprising fibre-reinforced plastic materials, or a helical multi-flute router or a burr for edge-finishing bodies comprising composites materials. The cutter element may be for a routing tool, or a tool for milling or trimming edges of a body, particularly a body comprising material reinforced with carbon fibre. In another example, the cutter element is for a ball-nose tool.

The disclosed method is likely to have the aspect of decreased risk of the super-hard structure being formed distorted and requiring processing to correct the distortion or the construction to be discarded. Processing of super-hard material tends to be relatively costly is may generally be undesirable. The spacer structures may have the effect of reducing misalignment of the substrate and since even slight misalignment can result in an deformed super-hard structure and high costs for correcting the shape, the benefits of using the spacer structure may be very substantial.

Non-limiting examples are described below in more detail.

EXAMPLE 1

An annular blank construction from which a PCD end mill or router can be made, can be manufactured as follows.

An aggregation comprising diamond particles having a mean size of at least about 1 micron and at most about 15 microns can be prepared by blending the diamond particles with powder comprising cobalt catalyst material for diamond. Plasticiser material such as PMMA or DBP can be introduced into the blend in order to make a slurry that is sufficiently viscous that it can be cast. The blending can be achieved by means of a ball mill. The slurry can be cast into a sheet, which can be dried and shredded to provide a plurality of plate-like granules.

A cylindrically shaped cobalt-cemented tungsten carbide rod having diameter of about 8 mm can be provided. The rod, which will function as a substrate for an annular PCD structure, can be placed concentrically within a cylindrical die for compacting powder, the diameter of the die being 12.5 mm. A first cemented carbide spacer ring having thickness of about 1 mm can be placed around the rod between the rod and the die wall at the bottom of the die, abutting the rod and the die wall to maintain the position of the rod. The diamond-containing granules can be poured into the space between the rod and the wall of the die and repeatedly compacted by means of an annular press device configured to fit between the rod and the die. When the space is filled with partially compacted granules, a second cemented carbide spacer ring can be placed around the rod at the top end on the die, above the granules. The inner diameter of the second spacer ring should be slightly larger, by about 0.05 mm, than the diameter of the rod so that the second spacer ring can slide down the rod when subjected to the ultra-high pressure during the sintering step, which is described below. This will reduce the risk of non-uniform compaction of the aggregation and the formation of non-planar ends of the construction. The second spacer ring can be made of ceramic or metal alloy material having high creep resistance at temperatures of at least about 900 degrees centigrade.

The annular press device can be applied to the second (top) spacer ring, a load can be applied to the press device and the granules can be compacted to provide a dense green body aggregation (i.e. a shaped and compacted aggregation still comprising the plasticiser) having an annular shape and surrounding the rod. After compaction, the assembly comprising the rod, green body aggregation and spacer rings at opposite ends of the rod can be removed and placed within a cup made of refractory metal. The assembly can be heat treated in a vacuum at about 1,050 degrees centigrade in order to remove plasticiser binder material by outgassing. A second cup made of the refractory metal can then be placed over the uncapped end of the assembly such that the pair of opposite cups overlap each other, thus completely encasing the assembly to provide a complete pre-sinter assembly. The pair of cups are welded together around the circumference of the pre-sinter assembly where the cups overlap, by means of an electron beam welding apparatus. In other examples, the pre-sinter assembly may be isostatically compressed to join the cups mechanically.

The pre-sinter assembly can then be assembled into a capsule for a belt-type ultra-high pressure press. The capsule may comprise an outer tube comprising pyrophyllite and an inner tube comprising sodium chloride salt, the pre-sinter assembly being inserted into the inner tube such that the outer side surface of the metal encasement abuts the inner surface of the inner tube. The per-sinter assembly can be subject to an ultra-high pressure of about 5.5 GPa and a temperature of about 1,300 degrees centigrade for a sufficiently long period for the cobalt in the substrate and in the aggregation to melt and the diamond grains of the aggregation to inter-grow with each other to form a PCD annulus joined to a cemented carbide core. The pressure and temperature can be reduced to ambient conditions and the capsule and metal cupping material removed by sand blasting and or acid treatment to provide a construction comprising a PCD structure surrounding the carbide rod, to opposite ends of which the carbide rings are joined. The construction can be used as a blank for making an end mill or router cutting tool by means of further processing, including forming cutting edges on the PCD structure.

EXAMPLE 2

A blank body can be made substantially as described in Example 1, except that the rod structure and spacer structure can be a unitary body. In other words, the substrate can comprise the rod structure and a circumferential, radially-projecting end structure at one end instead of the first spacer ring. When viewed in longitudinal cross section through the centre of the substrate, it will appear as a "T" shaped structure. The substrate will be inserted into the die with the end structure at the bottom of the die so that the granules can be poured into the space between the rod structure and the die wall.

EXAMPLE 3

A blank body can be made substantially as described in Example 1, except that a disc spacer structure can be used instead of the first spacer ring. In other words, the disc can be placed at the bottom of the die and the rod can be placed on top of the disc, concentric with it. If the end spacer disc is made cemented carbide or metal alloy, it is likely that it will become joined to the rod during the sintering step at the ultra-high pressure and high temperature. If necessary, it can be removed by grinding or cutting.

EXAMPLE 4

A blank body can be made as described in Example 1, Example 2 or Example 3, except that the slurry may be made sufficiently viscous so that it can be injection molded by extrusion. The slurry can be put into an extrusion device comprising an annular outlet, and pressurised to extrude a tube comprising the slurry. In some variations of this example, the tube may be extruded directed around a rod that will be the substrate. In other variations, the tube will have sufficient rigidity to be transported to the substrate remote from the extrusion device and placed onto it.

EXAMPLE 5

An PCBN annular blank body from which a PCBN end mill or router can be made, can be manufactured analogously to a PCD blank body substantially as described in Example 1, Example 2, Example 3 or Example 4, except that the slurry will comprise cBN particles instead of diamond particles and they will be combined with powder comprising Ti, Al, W and or Co for making binder material for the cBN grains. The size distribution of the cBN particles may be at least about 0.5 micron and at most about 10 microns.

Certain terms and concepts as used herein are briefly explained below.

A machine tool is a powered mechanical device, which may be used to manufacture components comprising materials such as metal, composite materials, wood or polymers by machining. Machining is the selective removal of material from a body or a workpiece. A rotary machine tool is a machine tool comprising a cutter element, for example a drill bit, which rotates about its own axis in use. A rake face of a cutter element is the surface or surfaces over which the chips flow when the tool is used to remove material from a body, the rake face directing the flow of newly formed chips. Chips are the pieces of a body removed from the work surface of the body by a machine tool in use. A flank of a cutter element is the surface or surfaces of the machine tool that passes over the machined surface produced on the body by a machine tool. The flank may provide a clearance from the body and may comprise more than one flank face. A cutting edge is the edge of a rake face intended to perform cutting of a body and a flute is a recessed portion of a rotary machine tool that is capable of conveying chips away from a cutting edge as the tool rotates in use. Example rotary machine tools such as taps, ball-nose end mills and straight end mills (which may sometimes be referred to as slot-drills) may have up to six or more cutting edges and flutes. A helical flute (also called a spiral flute) comprises a flute arranged generally and at least partially helically with respect to a rotational axis of a rotary machine tool, and a bi-directional helical flute configuration comprises flutes having different or opposite helical directions.

As used herein, a super-hard material has a Vickers hardness of at least about 28 GPa. Diamond and cubic boron nitride (cBN) material are examples of super-hard materials. Polycrystalline diamond (PCD) material comprises a mass (an aggregation of a plurality) of diamond grains, a substantial portion of which are directly inter-bonded with each other and in which the content of diamond is at least about 80 volume percent of the material. Interstices between the diamond grains may be at least partly filled with a binder material comprising catalyst material for synthetic diamond, or they may be substantially empty. A catalyst material for synthetic diamond is capable of promoting the growth of synthetic diamond grains and or the direct inter-growth of synthetic or natural diamond grains at a temperature and pressure at which synthetic or natural diamond is thermodynamically stable. Examples of catalyst materials for diamond are Fe, Ni, Co and Mn, and certain alloys including these. Super-hard structures comprising PCD material may comprise at least a region from which catalyst material has been removed from the interstices, leaving interstitial voids between the diamond grains. PCD structures having at least a significant region from which catalyst material for diamond has been depleted, or in which catalyst material is in a form that is relatively less active as a catalyst, may be described as thermally stable PCD.

PCBN material comprises grains of cubic boron nitride (cBN) dispersed within a matrix comprising metal or ceramic material. For example, PCBN material may comprise at least about 60 volume percent cBN grains dispersed in a binder matrix material comprising a Ti-containing compound, such as titanium carbonitride and/or an Al-containing compound, such as aluminium nitride, and/or compounds containing metal such as Co and/or W. Some versions (or "grades") of PCBN material may comprise at least about 80 volume percent or even at least about 85 volume percent cBN grains.

More generally, a polycrystalline super-hard (PCS) material comprises a mass of grains of a super-hard material and interstices between the super-hard grains, which may be at least partly filled with filler or binder material, the content of the super-hard grains being at least about percent of the material by volume. The grains may comprise diamond or cubic boron nitride (cBN).

The invention claimed is:

1. A method of making a construction comprising a polycrystalline super-hard structure joined to a side surface of an elongate substrate; the method including: providing a vessel configured for an ultra-high pressure of at least 4 GPa, high temperature furnace configured to reach a temperature of at least 1000° C., the vessel having an elongate cavity for containing a pre-sinter assembly and defining a longitudinal axis, the cavity having opposite ends connected by a cavity wall; the pre-sinter assembly comprising the substrate, an aggregation comprising a plurality of super-hard grains arranged over at least a part of the side surface of the substrate, and an annular spacer structure configured for spacing the substrate apart from the cavity wall; the spacer structure comprising material having a Young's modulus of at least 300 GPa; the method further including inserting the pre-sinter assembly into the cavity, the substrate being substantially longitudinally aligned and the spacer structure arranged between the side surface of the substrate and the cavity wall; applying a force to the pre-sinter assembly and heating it to a temperature, the force being sufficient to generate a pressure within the vessel for sintering the aggregation at the temperature, and providing the construction, wherein the spacer and the polycrystalline super-hard structure comprise different materials.

2. A method as claimed in claim 1, in which the substrate comprises the spacer structure extending laterally from an elongate core structure of the substrate.

3. A method as claimed in claim 1, in which the spacer structure abuts the substrate.

4. A method as claimed in claim 1, in which the force is applied longitudinally or tri-axially to the pre-sinter assembly.

5. A method as claimed in claim 1, in which the substrate comprises an elongate core structure and an end cap defining a proximate end surface of the substrate, the end cap extending laterally beyond the core structure.

6. A method as claimed in claim 1, in which the spacer structure abuts the cavity wall.

7. A method as claimed in claim 1, the method including using more than one spacer structure, each arranged at a different respective longitudinal position along the substrate.

8. A method as claimed in claim 1, in which the substrate is rotationally symmetric about a central longitudinal axis.

9. A method as claimed in claim 1, in which the spacer structure comprises material having a Young's modulus of at least 300 GPa at a temperature of at least 1,000 degrees centigrade.

10. A method as claimed in claim 1, in which the spacer structure comprises cemented tungsten carbide.

11. A method as claimed in claim 1, in which the spacer structure comprises ceramic material.

12. A method as claimed in claim 1, in which the spacer structure comprises nickel based super-alloy material.

13. A method as claimed in claim 1, in which the spacer structure comprises super-hard material.

14. A method as claimed in claim 1, in which the vessel comprises pyrophyllite, mullite, kyonite, kaolinite, salt or ceramic material.

15. A method as claimed in claim 1, in which the super-hard grains comprise natural or synthetic diamond material, or cubic boron nitride (cBN) material.

16. A method as claimed in claim 1, in which the polycrystalline super-hard structure comprises polycrystalline diamond (PCD) material, polycrystalline cubic boron nitride (PCBN) material, silicon carbide bonded diamond (SCD) material or cemented carbide material comprising super-hard grains.

17. A method as claimed in claim 1, in which the construction is for a blank body from which a rotary machine tool cutter element can be manufactured.

18. A method as claimed in claim 1, in which the aggregation comprises super-hard grains and binder material binding the grains together.

19. A method as claimed in claim 1, in which the aggregation comprises a plurality of filaments, foils or sheets comprising the super-hard grains.

20. A method as claimed in claim 1, including providing granules comprising the super-hard grains, and combining and compacting the granules against the substrate.

21. A method as claimed in claim 1, in which the aggregation comprises an extruded body comprising the super-hard grains.

22. A method as claimed in claim 1, in which the aggregation is spaced apart from at least one end of the substrate by at least 1 mm.

23. A method as claimed in claim 1, in which the aggregation is spaced apart from at least one end of the substrate by the spacer structure.

24. A method as claimed in claim 1, in which the aggregation extends peripherally all the way around at least a part of the substrate.

25. A method as claimed in claim 1, the method including processing the super-hard structure to provide a cutting edge.

26. A method as claimed in claim 1, the method including brazing an end of the construction to a tool carrier.

* * * * *